United States Patent
Muramatsu et al.

(10) Patent No.: US 11,971,487 B2
(45) Date of Patent: Apr. 30, 2024

(54) FEATURE DATA STRUCTURE, CONTROL DEVICE, STORAGE DEVICE, CONTROL METHOD, PROGRAM AND STORAGE MEDIUM

(71) Applicant: PIONEER CORPORATION, Tokyo (JP)

(72) Inventors: Eiji Muramatsu, Saitama (JP); Yoshinori Abe, Saitama (JP); Kazutoshi Kitano, Saitama (JP); Kenji Mito, Saitama (JP); Takeshi Koda, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 408 days.

(21) Appl. No.: 15/999,274

(22) PCT Filed: Feb. 19, 2016

(86) PCT No.: PCT/JP2016/054806
§ 371 (c)(1),
(2) Date: Aug. 17, 2018

(87) PCT Pub. No.: WO2017/141414
PCT Pub. Date: Aug. 24, 2017

(65) Prior Publication Data
US 2019/0041523 A1    Feb. 7, 2019

(51) Int. Cl.
*G01S 17/931* (2020.01)
*G01C 21/00* (2006.01)
(Continued)

(52) U.S. Cl.
CPC ............ *G01S 17/931* (2020.01); *G01C 21/28* (2013.01); *G01C 21/3811* (2020.08);
(Continued)

(58) Field of Classification Search
CPC ............ B60R 16/037; G06F 16/24575; G06F 16/252; G06F 16/335; G06F 16/29;
(Continued)

(56) References Cited

U.S. PATENT DOCUMENTS 5,170,352 A * 12/1992 McTamaney ........ G05D 1/0242
                                                        318/587
9,121,703 B1 * 9/2015 Droz ...................... G01S 17/42
(Continued)

FOREIGN PATENT DOCUMENTS

| CN | 108351402 A | 7/2018 |
| EP | 1909247 A1 | 4/2008 |

(Continued)

OTHER PUBLICATIONS

Extended European Search Report for related EP App No. 16890555.2 dated Sep. 25, 2019, 9 pgs.
(Continued)

*Primary Examiner* — Luke D Ratcliffe
(74) *Attorney, Agent, or Firm* — Procopio, Cory, Hargreaves & Savitch LLP

(57) ABSTRACT

An advanced map DB 43 stored on a server device 4 includes pulse type information that is configuration information for detecting a landmark using a LIDAR 2. By sending request information D1 including own vehicle position information, the vehicle mounted device 1 receives response information D2 including pulse type information corresponding to a landmark around the own vehicle position and controls the LIDAR 2 on the basis of the received pulse type information.

15 Claims, 8 Drawing Sheets

(51) Int. Cl.
*G01C 21/28* (2006.01)
*G01S 7/484* (2006.01)
*G01S 7/486* (2020.01)
*G01S 7/4865* (2020.01)
*G01S 17/42* (2006.01)
*G01S 17/86* (2020.01)
*G01S 17/89* (2020.01)
*G06F 16/29* (2019.01)
*G09B 29/00* (2006.01)

(52) U.S. Cl.
CPC .......... *G01C 21/3848* (2020.08); *G01S 7/484* (2013.01); *G01S 7/4865* (2013.01); *G01S 7/4868* (2013.01); *G01S 17/42* (2013.01); *G01S 17/86* (2020.01); *G01S 17/89* (2013.01); *G06F 16/29* (2019.01); *G09B 29/00* (2013.01)

(58) Field of Classification Search
CPC .......... G06K 9/00288; G06K 9/00302; G06K 9/00838; G01S 17/931; G01S 17/86; G01S 7/484; G01S 7/4865; G01S 7/4868; G01S 17/42; G01S 17/89; G01S 17/894; G01C 21/28; G09B 29/00
See application file for complete search history.

(56) References Cited

U.S. PATENT DOCUMENTS

| | | | |
|---|---|---|---|
| 9,383,753 B1* | 7/2016 | Templeton | G01S 17/89 |
| 2003/0043436 A1 | 3/2003 | Nagai | |
| 2009/0273770 A1* | 11/2009 | Bauhahn | G01S 17/10 |
| | | | 356/5.01 |
| 2010/0121886 A1* | 5/2010 | Koshiba | G09B 29/00 |
| | | | 707/E17.005 |
| 2013/0251208 A1* | 9/2013 | Kuehnle | G06V 20/56 |
| | | | 382/104 |
| 2016/0275667 A1* | 9/2016 | Modica | G01S 17/06 |
| 2017/0010618 A1* | 1/2017 | Shashua | G08G 1/096805 |
| 2017/0031364 A1* | 2/2017 | Takahashi | G05D 1/0212 |
| 2017/0045616 A1 | 2/2017 | Masuda et al. | |
| 2017/0124883 A1* | 5/2017 | Modica | G08G 5/025 |
| 2018/0254607 A1* | 9/2018 | Kitano | H01S 5/0428 |

FOREIGN PATENT DOCUMENTS

| | | |
|---|---|---|
| EP | 3361281 A1 | 8/2018 |
| JP | H07248382 A | 9/1995 |
| JP | 2003-069505 A | 3/2003 |
| JP | 2005-156261 A | 6/2005 |
| JP | 2007-322138 A | 12/2007 |
| JP | 2008-275331 A | 11/2008 |
| JP | 2009229182 A | 10/2009 |
| JP | 2010-170449 A | 8/2010 |
| JP | 2010-271166 A | 12/2010 |
| JP | 2012-141233 A | 7/2012 |
| JP | 2013-113684 A | 6/2013 |
| JP | 2015094722 A | 5/2015 |
| WO | 2015166712 A1 | 11/2015 |

OTHER PUBLICATIONS

International Search Report for related International Application No. PCT/JP2016/054806, dated May 17, 2016; English translation provided; 4 pages.

* cited by examiner

FIG. 4

| PEAK POWER \ SIZE REFLECTANCE | SMALL | MIDDLE | LARGE |
|---|---|---|---|
| HIGH (p1) | PULSE TYPE A (c1, p1) | PULSE TYPE D (c2, p1) | PULSE TYPE G (c3, p1) |
| MIDDLE (p2) | PULSE TYPE B (c1, p2) | PULSE TYPE E (c2, p2) | PULSE TYPE H (c3, p2) |
| LOW (p3) | PULSE TYPE C (c1, p3) | PULSE TYPE F (c2, p3) | PULSE TYPE I (c3, p3) |

PULSE PERIOD: SHORT — c1 — c2 — c3 → LONG

PEAK POWER: LOW (p1) ↓ HIGH (p3)

FEATURE DATA STRUCTURE, CONTROL DEVICE, STORAGE DEVICE, CONTROL METHOD, PROGRAM AND STORAGE MEDIUM

CROSS-REFERENCE TO RELATED APPLICATIONS

This application is a U.S. National Stage entry of PCT Application No: PCT/JP2016/054806 filed Feb. 19, 2016, the contents of which are incorporated herein by reference.

TECHNICAL FIELD

The present invention relates to a technology for detecting an object.

BACKGROUND TECHNIQUE

Conventionally, there is known a technology for measuring the distance to a peripheral object by emitting a laser light and receiving the reflective light thereof. For example, Patent Reference-1 discloses a measurement device for measuring a wide variety of objects including an peripheral object having a high reflectance and a distant object with a low reflectance, wherein the measurement device determines a distance value as a measured distance based on an unsaturated receiving wave with a high intensity by dynamically changing the transmission intensity of the laser light or the reception amplification factor at predetermined time intervals.

Patent Reference-1: Japanese Patent Application Laid-open under No. 2008-275331

DISCLOSURE OF INVENTION

Problem to be Solved by the Invention

According to Patent Reference-1, every time detecting an object, the device needs to calculate the distance value while changing the transition intensity or receiving intensity at the predetermined time intervals. Thus, unfortunately, it takes time to determine proper conditions on the laser and the reception amplification factor for calculating the distance value.

The above is an example of the problem to be solved by the present invention. An object of the present invention is to efficiently and precisely detect an object.

Means for Solving the Problem

One invention is a feature data structure regarding a feature including configuration information of a detection device for the detection device to detect the feature.

Another invention is a feature data structure regarding plural features including plural pieces of configuration information of a detection device for the detection device to respectively detect the features.

Still another invention is a control device including: a first acquisition unit configured to obtain position information which indicates a position of a moving body; a second acquisition unit configured to obtain configuration information that indicates a configuration of a detection unit for the detection device to detect a feature around the position indicated by the position information; and a control unit configured to control the detection unit based on the configuration information.

Still another invention is a storage device storing feature information regarding a feature, wherein the feature information includes configuration information of a detection device for the detection device to detect the feature.

Still another invention is a control method executed by a control device including: a first acquisition process to obtain position information which indicates a position of a moving body; a second acquisition process to obtain configuration information on configuration of a detection unit for the detection unit to detect a feature around the position indicated by the position information; and a control process to control the detection unit based on the configuration information.

Still another invention is a program executed by a computer, the program making the computer function as: a first acquisition unit configured to obtain position information which indicates a position of a moving body; a second acquisition unit configured to obtain configuration information on configuration of a detection unit for the detection unit to detect a feature around the position indicated by the position information; and a control unit configured to control the detection unit based on the configuration information.

BRIEF DESCRIPTION OF THE DRAWINGS

FIG. 4 illustrates a table which indicates pulse types of pulse laser beams which the pulse type information indicates.

DETAILED DESCRIPTION OF THE PREFERRED EMBODIMENTS

Figure 1:
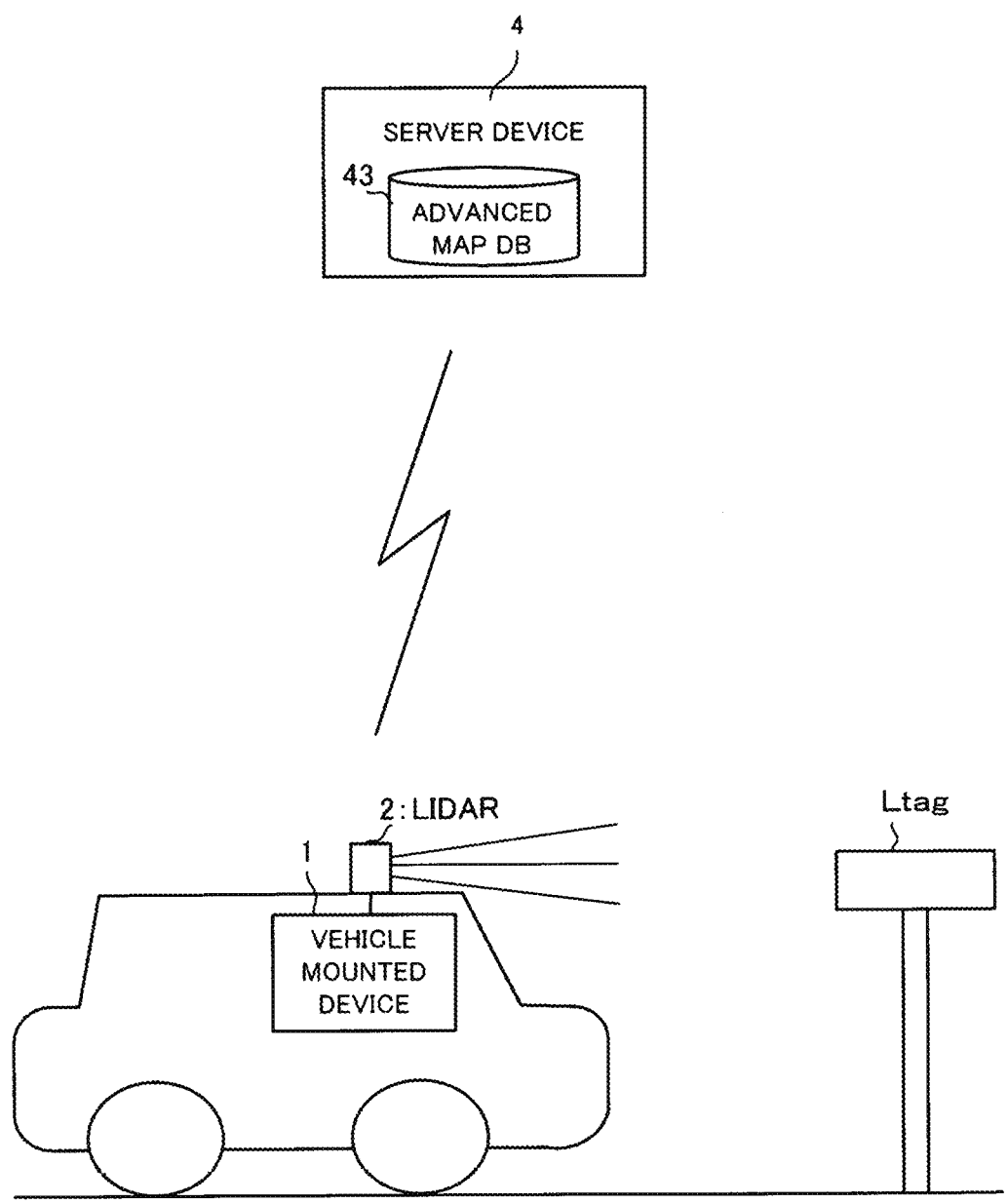
FIG. 1 illustrates a schematic configuration of an advanced map system.

According to a preferable embodiment of the present invention, there is provided a feature data structure regarding a feature including configuration information of a detection device for the detection device to detect the feature. The term "feature" herein includes any natural or artificial objects on earth such as a tree, a river, a building (house), a road and a rail. In this mode, a feature data structure regarding a feature includes configuration information for a detection device to detect the feature. Thus, according to this mode, at the time of detecting a feature by a detection device, it is possible to determine configuration information with reference to the configuration information of the feature data structure. In this case, it is unnecessary to make a measurement for determining the configuration information. Thus, it is possible to obtain a detection result from a detection device with assurance of a predetermined degree of accuracy while efficiently measuring a feature.

In one mode of the feature data structure, the detection device includes an emitting unit configured to emit light while changing an emitting direction of the light and a receiving light unit configured to receive the light, and the configuration information is information on a parameter relating to a light emission by the emitting unit. According to this mode, on the basis of the configuration information included in the feature data structure, a detection device can properly determine the parameter relating to the light emission in accordance with a target feature of detection.

In another mode of the feature data structure, the configuration information is information on a peak power of the light or on a cycle period of the light emission. According to this mode, the detection device emits light with a peak power and in an emission cycle in accordance with the size and/or the reflectance of a feature to be irradiated with the light. Thus, the detection device can precisely detect the feature.

According to another preferable embodiment of the present invention, there is provided a feature data structure regarding plural features including plural pieces of configuration information of a detection device for the detection device to respectively detect the features. According to this mode, at the time of detecting plural features by a detection device, it is possible to determine configuration information for detecting each of the plural features with reference to the configuration information of the feature data structure. In this case, it is unnecessary to make a measurement for determining the configuration information. Thus, it is possible to obtain a detection result from a detection device with assurance of a predetermined degree of accuracy while efficiently measuring a feature.

According to another preferable embodiment of the present invention, there is provided a control device including: a first acquisition unit configured to obtain position information which indicates a position of a moving body; a second acquisition unit configured to obtain configuration information that indicates a configuration of a detection unit for the detection device to detect a feature around the position indicated by the position information; and a control unit configured to control the detection unit based on the configuration information. At the time of detecting a feature situated around the moving body by using a detection unit, the control device according to this mode obtains configuration information for detecting the feature to thereby easily and precisely detect the feature by the detection unit.

In one mode of the control device, the second acquisition unit obtains the configuration information corresponding to the feature from a server device on which a database of feature information is stored, the feature information including the configuration information per feature. The control device according to this mode can obtain from the server device configuration information for detecting a feature situated around the moving body and detect the feature by using the detection unit.

In another mode of the control device, the detection unit emits light while changing an emitting direction of the light, wherein position information on each feature is included in feature information, wherein the second acquisition unit obtains position information on the feature along with the configuration information, and, wherein at a time when there are plural features to be detected by the detection unit, on a basis of the position information on the plural features and the position information on the moving body, the control unit specifies emitting directions of the light where the plural features are situated respectively and switches the configuration information to be applied to the detection unit depending on each of the specified emitting directions. When simultaneously detecting plural features by a detection unit, the control device according to this mode can precisely detect each of the plural features by switching the configuration information to apply in accordance with each direction corresponding to each of the plural features.

According to another preferable embodiment of the present invention, there is provided a storage device storing feature information regarding a feature, wherein the feature information includes configuration information of a detection device for the detection device to detect the feature. According to this mode, at the time of detecting a feature by a detection device, it is possible to obtain a detection result from a detection device with assurance of a predetermined degree of accuracy without needing any processing for determining the optimal configuration information.

According to still another preferable embodiment of the present invention, there is provided a control method executed by a control device including: a first acquisition-process to obtain position information which indicates a position of a moving body; a second acquisition process to obtain configuration information on configuration of a detection unit for the detection unit to detect a feature around the position indicated by the position information; and a control process to control the detection unit based on the configuration information. By executing the control method, a control device can easily detect a feature by using a detection unit while obtaining a detection result from the detection device with assurance of a predetermined degree of accuracy.

According to still another preferable embodiment of the present invention, there is provided a program executed by a computer, the program making the computer function as: a first acquisition unit configured to obtain position information which indicates a position of a moving body; a second acquisition unit configured to obtain configuration information on configuration of a detection unit for the detection unit to detect a feature around the position indicated by the position information; and a control unit configured to control the detection unit based on the configuration information. By executing the program, a computer can easily detect a feature by using a detection unit while obtaining a detection result from the detection device with assurance of a predetermined degree of accuracy. Preferably, the program can be treated in a state that it is stored in a storage medium.

EMBODIMENT

Now, a preferred embodiment of the present invention will be described below with reference to the attached drawings.

[Overview of Advanced Map System]

FIG. 1 illustrates a schematic configuration of an advanced map system according to the embodiment. The advanced map system includes a vehicle mounted device 1 which moves together with a vehicle, a LIDAR (Light Detection and Ranging, or Laser Illuminated Detection and Ranging) 2 which is controlled by the vehicle mounted device 1, and a server device 4 which stores advanced map DB 43. With respect to each feature (referred to as "landmark") situated on or around a road, the advanced map system unifies the settings (configuration) of the LIDAR 2 for detecting the landmark to thereby generate compatible measurement data with a high degree of accuracy. FIG. 1 illustrates such an example that the LIDAR 2 detects a landmark Ltag that is a signage provided along the road.

The vehicle mounted device 1 is electrically connected to the LIDAR 2 and controls the light emission of the LIDAR 2 to detect a landmark. According to the embodiment, the vehicle mounted device 1 sends the server device 4 request information (referred to as "request information D1") including information on the own vehicle position to thereby receive, from the server device 4, response information (referred to as "response information D2") including information needed to detect a landmark. In the response information D2, there is included position information (referred to as "landmark position information") on a target landmark of detection and information (referred to as "pulse type information") on parameters relating to the control of light pulse emission of the LIDAR 2 for detecting the target landmark through the LIDAR 2. The vehicle mounted device 1 controls the LIDAR 2 based on the response information D2 sent from the server device 4 to precisely estimate the own vehicle position for autonomous driving based on the output of the LIDAR 2 and/or to generate update information on the advanced map DB 43 stored on the server device 4 based on the output of the LIDAR 2. The vehicle mounted device 1 is an example of the "control device" according to the present invention. It is noted that examples of landmarks registered on the advanced map DB 43 include not only artificial features such as a kilometer post, a hundred meter post, a delineator, a traffic infrastructure (e.g., a signage, a direction signboard and a traffic signal), a utility pole, a street lamp but also natural features such as a tree.

The LIDAR 2 discretely measures distance to an external object by emitting pulse laser beams within a predetermined angle range (angle of field) with respect to the horizontal direction and the vertical direction to thereby generate three-dimensional point group information indicating the position of the external object. In this case, the LIDAR 2 includes an emitting unit to emit laser light while changing the emitting direction, a light receiving unit to receive the reflective light (scattering light) of the emitted laser light and an output unit to output point group information based on the receiving signal outputted by the light receiving unit. The point group information is generated based on the emitting direction of the laser light received by the light receiving unit and the response delay time of the laser light specified based on the above-mentioned receiving signal. According to the embodiment, the LIDAR 2 is configured to be capable of adjusting, on the basis of the control signal supplied from the vehicle mounted device 1, the peak power of the emitting pulse laser beam and the cycle period (referred to as "pulse period") in which the pulse laser beam is repeatedly emitted. The LIDAR 2 is an example of the "detection device" or the "detection unit" according to the present invention.

The server device 4 stores the advanced map DB 43 including information (referred to as "landmark information") on landmarks. At the time of receiving the request information D1 from the vehicle mounted device 1, on the basis of the position information on the vehicle mounted device 1 included in the request information D1, the server device 4 extracts the landmark information corresponding to landmark(s) situated around the vehicle mounted device 1 and thereafter sends it to the vehicle mounted device 1 as the response information D2. As mentioned later, in the landmark information, there are at least included landmark position information and pulse type information. The server device 4 is an example of the "storage device" according to the present invention.

Figure 2A:
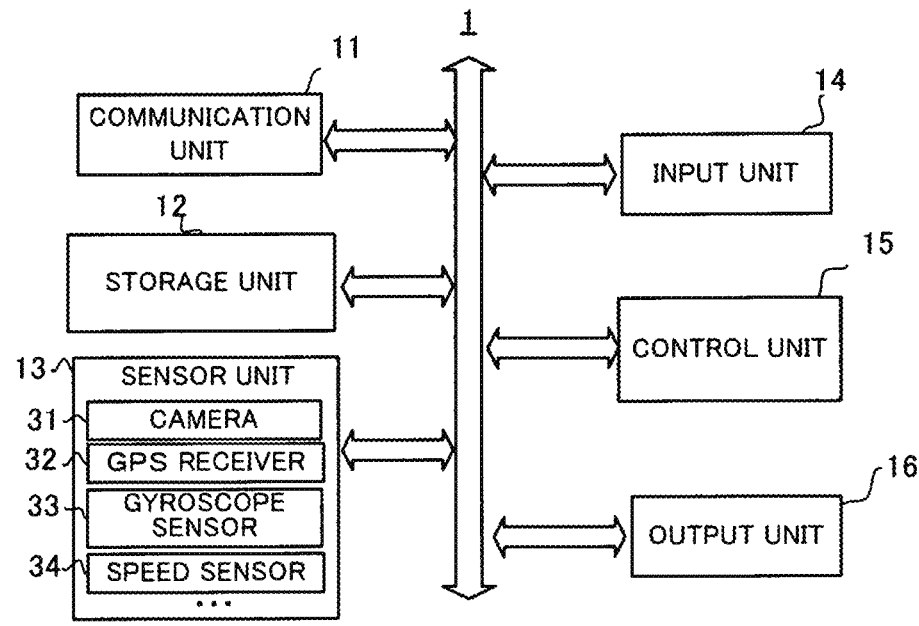
FIG. 2A illustrates a block diagram illustrating a functional configuration of a vehicle mounted device.

FIG. 2A is a block diagram illustrating a functional configuration of the vehicle mounted device 1. The vehicle mounted device 1 mainly includes a communication unit 11, a storage unit 12, a sensor unit 13, an input unit 14, a control unit 15 and an output unit 16. These elements are connected to each other via a bus line.

Under the control of the control unit 15, the communication unit 11 exchanges data with the server device 4. Additionally, under the control of the control unit 15, the communication unit 11 also supplies the LIDAR 2 with information on the control of emission of the pulse laser beam of the LIDAR 2. The storage unit 12 stores a program to be executed by the control unit 15 and information necessary for the control unit 15 to execute a predetermined processing.

The sensor unit 13 is configured of internal sensors which detect the state of the vehicle and external sensors for recognizing the peripheral environment of the vehicle. The sensor unit 13 includes a camera 31, a GPS receiver 32, a gyroscope sensor 33 and a speed sensor 34. According to the embodiment, on the basis of the output of the sensor unit 13, the control unit 15 generates present position information indicating the present position (i.e., own vehicle position) of the vehicle.

Examples of the input unit 14 include a button, a touch panel, a remote controller and an audio input device for user operations. The output unit 16 includes a display and/or a speaker which output under the control of the control unit 15.

The control unit 15 includes a CPU for executing programs and controls the entire vehicle mounted device 1. According to the embodiment, for example, the control unit 15 sends the request information D1 including the own vehicle position information through the communication unit 11 to the server device 4 at predetermined time intervals. At the time when the communication unit 11 receives the response information D2, on the basis of the pulse type information included in the response information D2, the control unit 15 sends the LIDAR 2 a control signal for changing the peak power of the pulse laser beam of the LIDAR 2 and/or the pulse period thereof. Then, the control unit 15 analyzes the output of the LIDAR 2 by using known analysis technologies to perform peripheral environment recognition processing, own vehicle position estimating processing and/or generating processing of update information on the advanced map DB 43. The control unit 15 is an example of "the first acquisition unit", "the second acquisition unit", "the control unit" and a computer which executes the program according to the present invention.

Figure 2B:
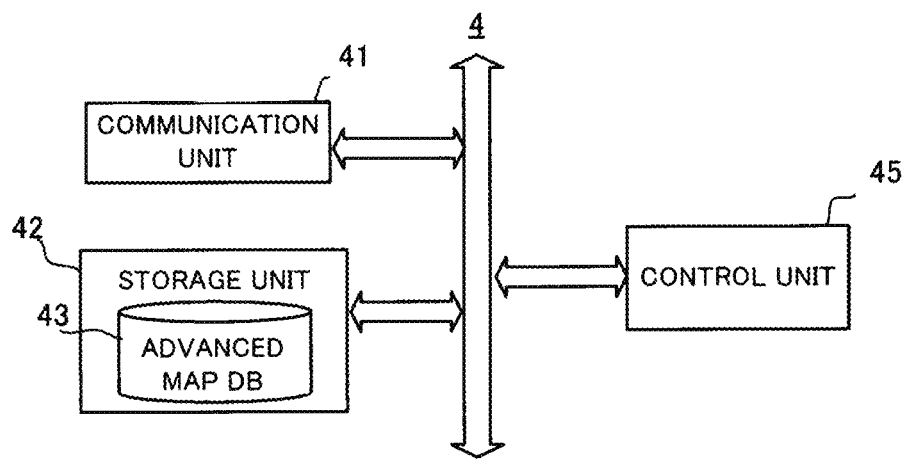
FIG. 2B illustrates a block diagram illustrating a functional configuration of a server device.

FIG. 2B is a block diagram illustrating a functional configuration of the server device 4. The server device 4 mainly includes a communication unit 41, a storage unit 42 and a control unit 45. These elements are connected to each other via a bus line.

The communication unit 41 exchanges data with the vehicle mounted device 1 under the control of the control unit 45. The storage unit 42 stores a program to be executed by the control unit 45 and information necessary for the control unit 45 to execute a predetermined processing. According to the embodiment, the storage unit 42 stores the advanced map DB 43. The advanced map DB 43 includes landmark information corresponding to each target landmark of detection by the LIDAR 2.

Figure 2C:
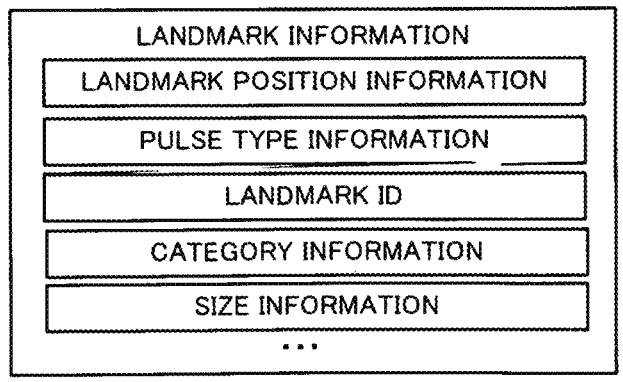
FIG. 2C illustrates a data structure of landmark information.

FIG. 2C illustrates a data structure of the landmark information. The landmark information is generated per landmark. For example, the landmark information includes landmark position information, pulse type information, landmark ID, category information and size information. It is noted that the pulse type information may vary depending on, for example, the shape or the size of the landmark and/or the reflectance to the light as mentioned later. In such a state that the landmark information with the data structure is stored on the advanced map DB 43, by specifying the position based on the position information (the position information on the vehicle mounted device 1) included in the request information D1, it is possible to extract landmark(s) situated around the specified position. Additionally, by referring to the landmark information corresponding to the extracted landmark(s), it is possible to extract the configuration information on the LIDAR 2 for the LIDAR 2 to detect the landmark(s), i.e., the configuration information suitable for detection of the landmark(s) by the LIDAR 2. In addition to each kind of information mentioned above (or instead of the pulse type information), other information such as information on the shape of the landmark and information on the reflectance thereof may be included in the landmark information. The landmark information is an example of the "feature data structure" and the "feature information" according to the present invention. The pulse type information is an example of the "configuration information" according to the present invention and the advanced map DB 43 is an example of the "database" according to the present invention.

The landmark information may include, as the configuration information necessary for the LIDAR 2 to detect the landmark, information on the peak power and/or the pulse period regarding the pulse laser beam to be emitted by the LIDAR 2 instead of the pulse type information. In this case, the server device 4 generates the response information D2 which includes the information of the peak power and/or the pulse period regarding the pulse laser beam emission of the LIDAR 2 and sends it to the vehicle mounted device 1.

The control unit 45 includes a CPU for executing programs and controls the entire server device 4. According to the embodiment, at the time of receiving the request information D1 from the vehicle mounted device 1 through the communication unit 41, the control unit 45 extracts the landmark information corresponding to surroundings of the vehicle mounted device 1 by comparing the position information of the vehicle mounted device 1 included in the request information D1 to the landmark position information included in each piece of landmark information registered on the advanced map DB 43. Then, through the communication unit 41, the control unit 45 sends the response information D2 which includes at least landmark position information and pulse type information of the extracted landmark information to the server device 4.

[Control of Pulse Laser Beam Emission of LIDAR]

Next, a description will be given of the control of the pulse laser beam emission of the LIDAR 2 by the vehicle mounted device 1. On the basis of the pulse type information included in the response information D2 sent from the server device 4, the vehicle mounted device 1 determines the peak power and the pulse period of the pulse laser beam to be emitted by the LIDAR 2.

Figure 3A:
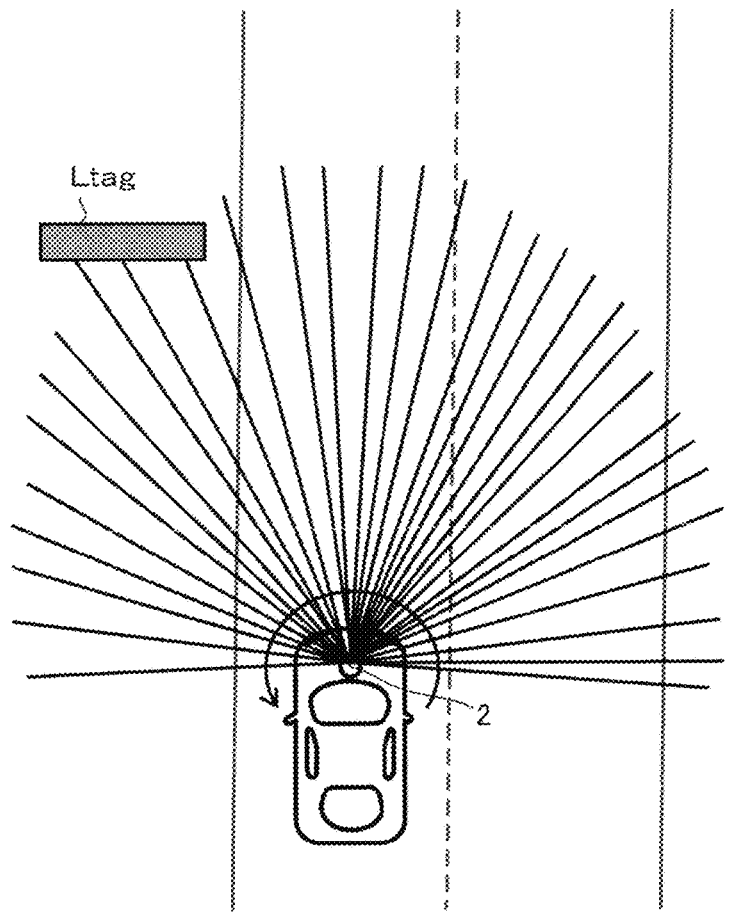
FIG. 3A illustrates lines of pulse laser beams which a LIDAR emits in one cycle of the scanning.
Figure 3B:
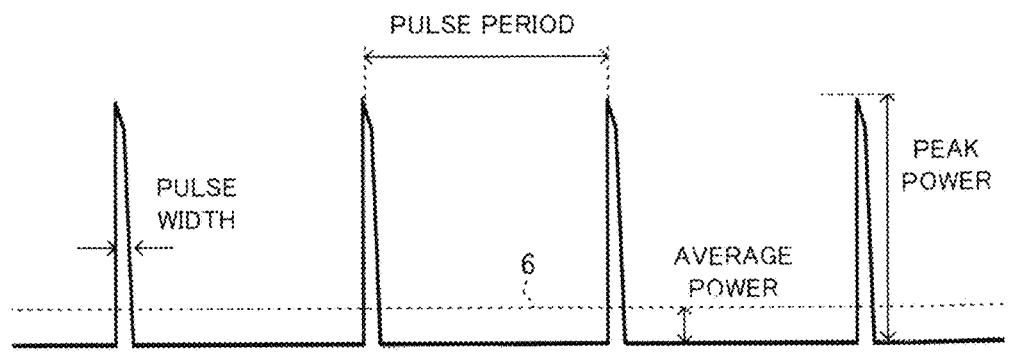
FIG. 3B illustrates a part of a waveform which indicates the time variation of the output power of the pulse laser beams emitted by the LIDAR.

FIG. 3A illustrates lines of the pulse laser beams which the LIDAR 2 emits in one cycle of the scanning and FIG. 3B illustrates a part of a waveform which indicates the time variation of the output power of the pulse laser beams emitted by the LIDAR 2.

In the example illustrated in FIG. 3A, within a predetermined angle of field (210° in this case) including the front direction of the vehicle, the LIDAR 2 emits the pulse laser beams with a predetermined angular resolution which depends on the pulse period. In the example illustrated in FIG. 3A, the vehicle mounted device 1 receives the pulse type information corresponding to the landmark Ltag from the server device 4 and emits the pulse laser beams with the peak power and with the pulse period based on the pulse type information. As illustrated in FIG. 3B, the peak power corresponds to the amplitude of the peaks of the waveform and the pulse period corresponds to the time interval between the peaks of the waveform. The average power of the pulse laser beams (see the dashed line 6) illustrated in FIG. 3B is identified based on the peak power, the pulse width and the pulse period, and the upper limit of the average power is provided for the purpose of the eye safety. Thus, the peak power, the pulse width and the pulse period are determined so that the average power does not exceed the criterion for the eye safety.

FIG. 4 is a table illustrating an example of pulse types of the pulse laser beam which the pulse type information indicates. According to this example, the pulse types (pulse type A to pulse type I in this case) correspond to combinations of plural levels of the peak power (p1 to p3 in this case) and plural levels of the pulse period (c1 to c3 in this case). Besides, the pulse types are different depending on the reflectance and the size of the target landmark of detection by the LIDAR 2. With reference to this table, by extracting the reflectance and the size of a landmark, it is possible to extract (recognize) the configuration information (i.e., pulse type) for the LIDAR 2 to detect the landmark.

Generally, the lower the reflectance (i.e., reflective property) of a landmark, the higher the peak power of the pulse laser beam with which the landmark is irradiated needs to be. Furthermore, the smaller the size of the landmark is, the shorter the pulse period of the pulse laser beams with which the landmark is irradiated needs to be in order to increase the angular resolution.

Above things considered, according to the example illustrated in FIG. 4, the reflectance of the landmark is classified into three levels "HIGH", "MIDDLE", "LOW", wherein the reflectance "HIGH" is associated with the lowest peak power "p1" and the reflectance "LOW" is associated with the highest peak power "p3" and the reflectance "MIDDLE" is associated with intermediate peak power "p2". In the same way, according to the example illustrated in FIG. 4, the size of the landmark is classified into three levels "LARGE", "MIDDLE", "SMALL", wherein the size "LARGE" is associated with the longest pulse period "c3" and the size "SMALL" is associated with the shortest pulse period "c1" and the size "MIDDLE" is associated with the intermediate pulse period "c2". As a result, according to the example illustrated in FIG. 4, depending on the combination of three levels of the reflectance and three levels of the size regarding the landmark, it defines nine pulse types A to I which correspond to different combinations of three levels of the peak power and three levels of the pulse period.

As described above, the pulse type information indicates the combination of the proper peak power and the proper pulse period which are determined in advance in accordance with the reflectance and the size of the target landmark. Additionally, as illustrated in FIG. 2C, the pulse type information is stored on the advanced map DB 43 as a part of the landmark information. Thus, the vehicle mounted device 1 receives the response information D2 including the pulse type information from the server device 4 and determines the peak power and the pulse period of the LIDAR 2 based on the pulse type information. Thereby, the vehicle mounted device 1 can easily and precisely detect the landmark by use of the LIDAR 2.

IL is noted that, instead of the example illustrated in FIG. 4, the larger number of pulse types may be defined by classifying at least one of the reflectance and the size of the landmark into more than three levels. Even in this case, the lower the reflectance of the landmark is, the higher the corresponding peak power becomes, and the smaller the size of the landmark is, the shorter the corresponding pulse period becomes. Thereby, it is possible to more appropriately configure the LIDAR 2 in accordance with the reflectance and the size of the target landmark of detection. As a result, the target landmark can be precisely detected. In the same way, at least one of the reflectance and the size of the landmark may be classified into two levels.

Meanwhile, FIG. 2C illustrates such a data structure that the pulse type information is included in the landmark information. In contrast, in such a case that information on the size (shape) and/or the reflectance of the landmark instead of the pulse type information is included in the landmark information, the table illustrated in FIG. 4 may be stored on the storage unit 42 (or advanced map DB 43) in addition to the landmark information. In this case, with reference to the landmark information, it is possible to extract the size and the reflectance of the landmark which is situated around the position specified by the position information (position information of the vehicle mounted device 1) included in the request information D1. Furthermore, with reference to the table illustrated in FIG. 4, it is possible to extract the pulse type corresponding to the extracted size and the reflectance.

The peak power and the pulse period may be optimally determined in accordance with not only the pulse type information but also the relative distance between the landmark and the own vehicle, wherein the relative distance is calculated from the landmark position information and the position information on the vehicle mounted device 1. In this case, for example, on the assumption that the relative distance is classified into three levels "LARGE", "MIDDLE" and "SMALL", the relative distance "LARGE" may be associated with the level corresponding to the shortest pulse period, the relative distance "SMALL" may be associated with the level corresponding to the longest pulse period, and the relative distance "MIDDLE" may be associated with the level corresponding to the intermediate pulse period. Furthermore, in this case, the relative distance "LARGE" may be associated with the highest level of the peak power, the relative distance "SMALL" may be associated with the lowest level of the peak power and the relative distance "MIDDLE" may be associated with the intermediate level of the peak power.

[Process Flow]

Figure 5:
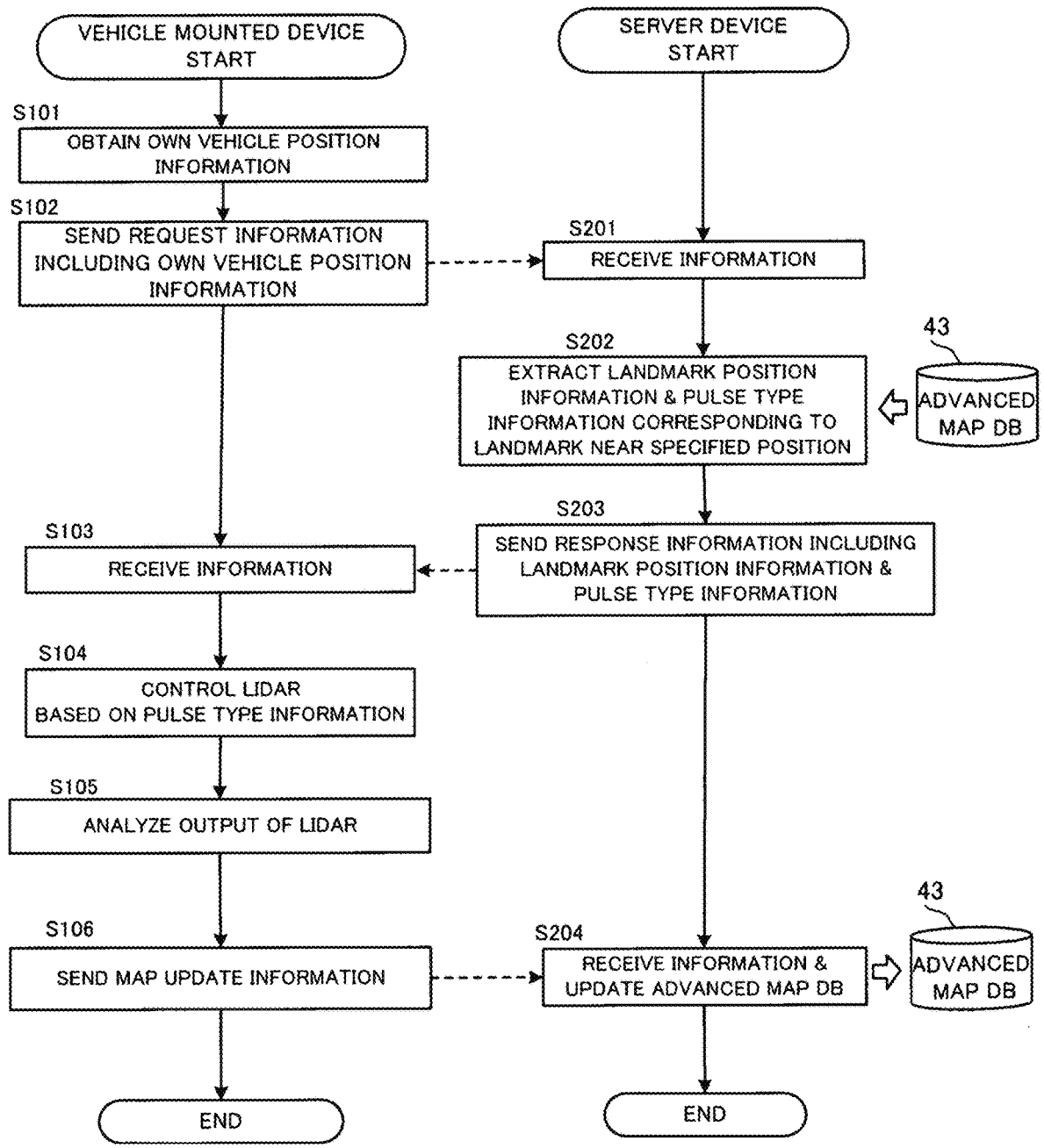
FIG. 5 is a flowchart indicating a procedure of the process according to an embodiment.

FIG. 5 is a flowchart indicating a procedure of the process according to the embodiment. FIG. 5 illustrates such a process flow as a typical example that the vehicle mounted device 1 updates the advanced map DB 43 based on the output of the LIDAR 2. For example, the vehicle mounted device 1 repeatedly executes the process according to the flowchart in FIG. 5 at predetermined intervals.

Firstly, the vehicle mounted device 1 obtains own vehicle position information based on the output of the sensor unit 13 (step S101). Next, the vehicle mounted device 1 sends the request information D1 including the own vehicle position information obtained at step S101 to the server device 4 (step S102).

The server device 4 receives the request information D1 from the vehicle mounted device 1 (step S201). In this case, the server device 4 extracts, from the advanced map DB 43, the landmark position information and the pulse type information corresponding to landmark(s) situated around the vehicle mounted device 1 (step S202). In this case, the server device 4 searches the advanced map DB 43 for landmark information whose landmark position information indicates a position within a predetermined distance from the position indicated by the position information of the request information D1, and extracts at least the landmark position information and the pulse type information from the landmark information that is searched for. Then, the server device 4 sends the vehicle mounted device 1 the response information D2 which includes at least the landmark position information and the pulse type information extracted at step S202 (step S203).

The vehicle mounted device 1 receives the response information D2 sent from the server device 4 (step S103). Then, the vehicle mounted device 1 controls the LIDAR 2 based on the pulse type information included in the response information D2 (step S104). It is noted that a description will be given in the section "Detection Process of Plural Landmark" of the process in such a case that the response information D2 includes the pulse type information and the landmark position information corresponding to plural landmarks.

Next, the vehicle mounted device 1 analyzes the output of the LIDAR 2 (step S105). For example, the control unit 15 firstly extracts the point group information of the target landmark from the output of the LIDAR 2 to thereby calculate the relative position of the target landmark with respect to the own vehicle position. Then, the control unit 15 estimates the absolute position of the target landmark based on the calculated relative position and the absolute position of the own vehicle recognized from the output of the sensor unit 13. Then, the control unit 15 sends the server device 4 the estimated position information of the target landmark as update information on the advanced map DB 43 (step S106). In this case, the control unit 15 may perform the transmission process at step S106 only at the time of determining that the update of the advanced map DB 43 is needed, e.g., at the time when the distance between the estimate position of the target landmark and the position indicated by the landmark position information included in the response information D2 is equal to or longer than a predetermined distance.

Then, at the time of receiving the update information on the advanced map DB 43, the server device 4 updates the advanced map DB 43 based on the update information (step S204).

According to this mode, the server device 4 can enable each vehicle on which a LIDAR 2 is mounted to measure landmarks by using the LIDAR 2 based on unified configuration conditions suitable for each landmark. Thereby, the server device 4 can obtain measurement data with a suitable measurement resolution and precision with respect to each landmark while enhancing the compatibility and the reliability of the measurement data. Thus, the server device 4 can obtain high-precision update information which is compatible with the landmark, information registered on the advanced map DB 43 from each vehicle traveling on a target road network. Thus, the server device 4 can keep the advanced map DB 43 up-to-date.

[Detection Process of Plural Landmark]

Next, a description will be given of simultaneous detection of multiple landmarks. Summarily, on the basis of the landmark position information on each target landmark and the own vehicle position information, the vehicle mounted device 1 recognizes each emitting angle at which each target landmark of detection is irradiated and switches pulse type information to apply to the LIDAR 2 in accordance with each emitting angle. Thereby, even when detecting plural landmarks at the same time, the vehicle mounted device 1 drives the LIDAR 2 on configuration conditions which are suitable for each landmark.

Figure 6:
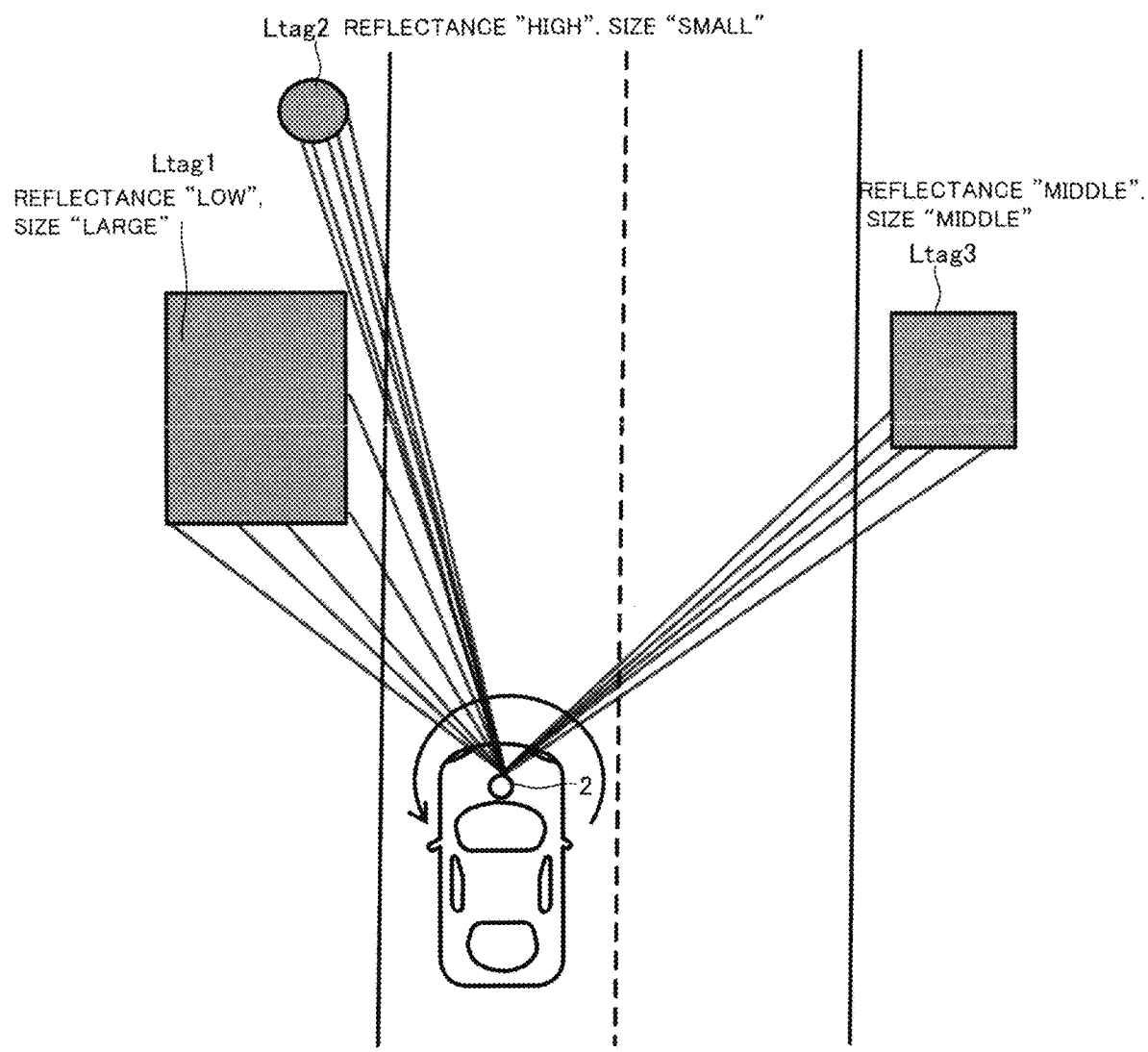
FIG. 6 illustrates pulse laser beams emitted in one cycle of scanning in a case where there are three landmarks.
Figure 7:
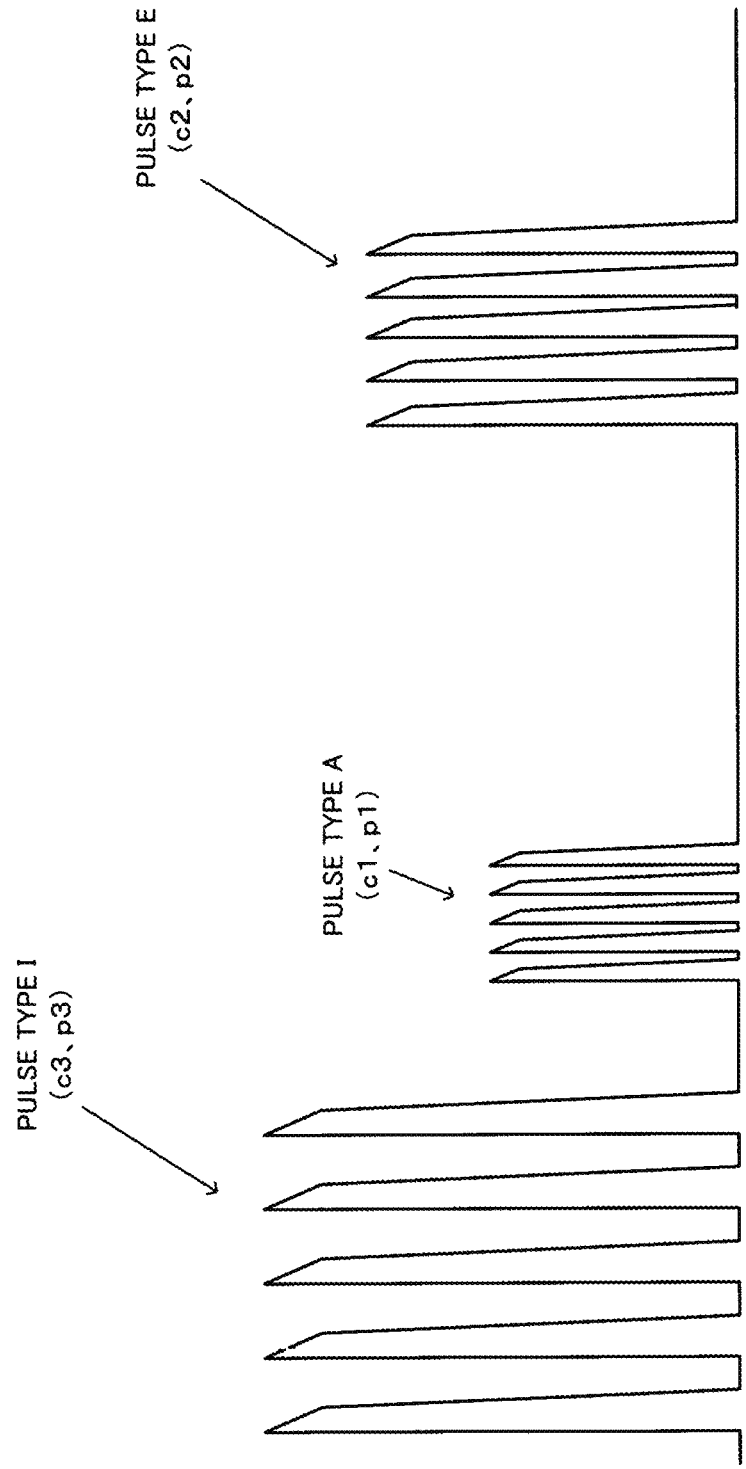
FIG. 7 illustrates a waveform which indicates time variations of the output power of pulse laser beams of the LIDAR at the cycle of the scanning according to the example in FIG. 6.

FIG. 6 illustrates pulse laser beams emitted in one cycle of scanning in a case where there are three landmarks Ltag1, Ltag2 and Ltag3. FIG. 7 illustrates a waveform which indicates the time variation of the output power of the pulse laser beam of the LIDAR 2 in the cycle of the scanning according to the example in FIG. 6. In this example, the landmark Ltag1 corresponds to the reflectance "LOW" and the size "LARGE" in the table illustrated in FIG. 4, the landmark Ltag2 corresponds to the reflectance "HIGH" and the size "SMALL", and the landmark Ltag3 corresponds to the reflectance "MIDDLE" and the size "MIDDLE".

According to the example illustrated in FIGS. 6 and 7, the vehicle mounted device 1 firstly receives, as the response information D2, the pulse type information, the landmark position information and information on the size with respect to each of the landmarks Ltag1 to Ltag3. Then, on the basis of the own vehicle position information recognized by the output of the sensor unit 13 and the landmark position information on each landmarks Ltag1 to Ltag3, the vehicle mounted device 1 calculates the relative position of the landmarks Ltag1 to Ltag3 with respect to the own vehicle position to thereby recognize the corresponding emitting angles of the pulse laser beam. Additionally, by considering, the information on the size of each landmark Ltag1 to Ltag3, the vehicle mounted device 1 recognizes each angle of field of the pulse laser beam within which each of the landmarks Ltag1 to Ltag3 is irradiated.

Then, at the time of scanning by the LIDAR 2, by using time-division system during one cycle of the scanning period, the vehicle mounted device 1 differentiates the peak power and the pulse period of the pulse laser beam with which the landmarks Ltag1 to Ltag3 are irradiated.

Concretely, within the emitting angle of field corresponding to the landmark Ltag1, the vehicle mounted device 1 emits the pulse laser beams by using the peak power and the pulse period indicated by the pulse type information corresponding to the landmark Ltag1. Since the landmark Ltag1 is a landmark classified as the reflectance "LOW" and the size "LARGE" in the table illustrated in FIG. 4, the pulse type information corresponding to the landmark Ltag1 indicates the pulse type I (i.e., pulse period c3 and peak power p3). Thus, within the emitting angle of field corresponding to the landmark Ltag1, the vehicle mounted device 1 controls the LIDAR 2 to emit pulse laser beams according to the pulse type I (i.e., pulse period c3 and peak power p3).

Similarly, since the landmark Ltag2 is a landmark classified as the reflectance "HIGH" and the size "SMALL", the pulse type information corresponding to the landmark Ltag2 indicates the pulse type A (i.e., pulse period c1 and peak power p1). Thus, within the emitting angle of field corresponding to the landmark Ltag2, the vehicle mounted device 1 controls the LIDAR 2 to emit pulse laser beams according to the pulse type A (i.e., pulse period c1 and peak power p1). Furthermore, since the landmark Ltag3 is a landmark classified as the reflectance "MIDDLE" and the size "MIDDLE", the pulse type information corresponding to the landmark Ltag3 indicates the pulse type E (i.e., pulse period c2 and peak power p2). Thus, within the emitting angle of field corresponding to the landmark Ltag3, the vehicle mounted device 1 controls the LIDAR 2 to emit pulse laser beams according to the pulse type E (i.e., pulse period c2 and peak power p2).

In this way, even when there are plural landmarks Ltag, with respect to each emitting angle of field within which each landmark Ltag is irradiated, the vehicle mounted device 1 controls the LIDAR 2 by referring to the pulse type information corresponding to each landmark Ltag situated within each emitting angle of field. Thereby, the vehicle mounted device 1 can suitably generate measurement data corresponding to each landmark Ltag based on the pulse type information registered on the advanced map DB 43.

As explained above, an advanced map DB 43 stored on a server device 4 includes pulse type information that is configuration information for detecting a landmark using a LIDAR 2. By sending request information D1 including own vehicle position information, the vehicle mounted device 1 receives response information D2 including pulse type information corresponding to a landmark around the own vehicle position and controls the LIDAR 2 on the basis of the received pulse type information. Thereby, the vehicle mounted device 1 can obtain from the LIDAR 2 a compatible output result with a predetermined degree of precision without any process of determining the configuration of the LIDAR 2 for detecting a landmark.

[Modifications]

Next, a description will be given of preferred modifications of the embodiment. The following modifications may be applied to the above embodiment in any combination.

(First Modification)

Instead of controlling the LIDAR 2 based on the pulse type information sent from the server device 4; the vehicle mounted device 1 may receive information on the reflectance and the size of the landmark from the server device 4 and determine the peak power and the pulse period of laser pulses of the LIDAR 2 by using received information to thereby control the LIDAR 2.

In this case, the server device 4 preliminarily stores information on the reflectance of a landmark and the size thereof as landmark information of the advanced map DB 43. At the time of receiving the request information D1, the server device 4 sends the vehicle mounted device 1 the response information D2 which includes information on the reflectance and the size of landmark(s). The vehicle mounted device 1 preliminarily stores a corresponding table as indicated in FIG. 4 in which the reflectance and the size of landmarks are associated with the peak power and the pulse period of the laser pulse to be emitted. Then, at the time of receiving the response information D2 from the server device 4, the vehicle mounted device 1 determines the peak power and the pulse period of the laser pulse which the LIDAR 2 should emit by referring to the above-mentioned corresponding table based on the information on the reflectance and the size included in the response information D2. Then, the vehicle mounted device 1 controls the LIDAR 2 based on the peak power and the pulse period.

According to the modification, the vehicle mounted device 1 can easily and precisely detect landmarks by using the LIDAR 2 based on the information sent from the server device 4.

[Second Modification]

The vehicle mounted device 1 instead of the server device 4 may store the advanced map DB 43 on the storage unit 12.

Figure 8:
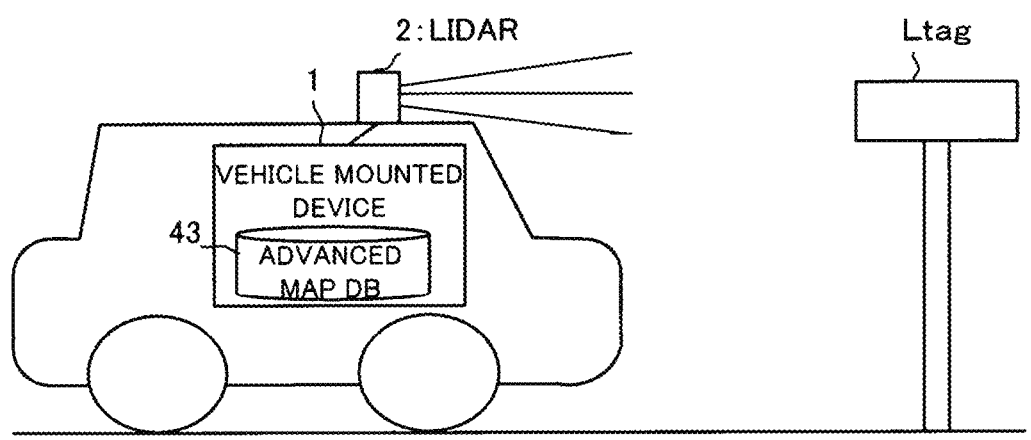
FIG. 8 illustrates a schematic configuration of an advanced map system according to a modification.

FIG. 8 illustrates an advanced map system according to the modification. According to FIG. 8, the vehicle mounted device 1 stores the advanced map DB 43. Regarding the flowchart illustrated in FIG. 5, the vehicle mounted device 1 obtains the own vehicle position information at step S101 and thereafter conducts the processing at step S202 on behalf of the server device 4. Thereby, the vehicle mounted device 1 extracts from the advanced map DB 43 the pulse type information corresponding to the landmark Ltag situated around the own vehicle position. Then, the vehicle mounted device 1 controls the LIDAR 2 based on the extracted pulse type information. According to this example, the vehicle mounted device 1 does not have to communicate with the server device 4.

In another example, the vehicle mounted device 1 may store a part of the advanced map DB 43 by downloading it from the server device 4. In this case, for example, the advanced map DB 43 is administrated per area, and at the time of arriving in a predetermined area for the first time, the vehicle mounted device 1 receives map data corresponding to the predetermined area from the server device 4. In still another example, the vehicle mounted device 1 may preliminarily store database of the landmark information corresponding to a part of the advanced map DB 43. Even in this case, the vehicle mounted device 1 does not have to exchange the request information D1 and the response information D2 with the server device 4.

(Third Modification)

The vehicle mounted device 1 may be configured to be separated from an own vehicle position measurement device which measures own vehicle position by using the sensor unit 13 and receive information on the own vehicle position from the own vehicle position measurement device.

BRIEF DESCRIPTION OF REFERENCE NUMBERS

1 Vehicle mounted device
2 LIDAR
3 Server device
11, 41 Communication unit
12, 42 Storage unit
13 Sensor unit
14 Input unit
15, 45 Control unit
16 Output unit
43 Advanced map DB

The invention claimed is:

1. A control device comprising:
a control unit, including a microprocessor, configured to:
obtain position information indicative of a position of a body;
obtain configuration information indicative of a parameter to be set to a detection unit, the configuration information being included in feature data for each of features registered in map data, the parameter being configured to be used by the detection unit to detect a feature substantially at the position indicated by the position information,
the parameter being determined depending on a reflectance of the feature,
the configuration information being associated with a cycle period of light emission; and
control the detection unit based on the configuration information to detect a target feature by applying the cycle period of light emission, which is associated with the configuration information corresponding to the target feature, to the detection unit.

2. The control device of claim 1, wherein the body is a vehicle.

3. The control device of claim 1, wherein the configuration information further comprises information on a parameter associated with the light emission by an emitter of the detection unit that is configured to emit light while changing an emitting direction of the light.

4. The control device according to claim 1, wherein the control unit obtains the configuration information corresponding to the feature from a database of feature information that includes the configuration information associated with the feature.

5. The control device according to claim 4, wherein the database is positioned at the body, or at a server.

6. The control device according to claim 1, wherein the detection unit emits light while changing an emitting direction of the light, and
wherein, for plural features to be detected by the detection unit, based on the position information associated with the plural features and the position information associated with the body, the control unit specifies emitting directions for respective locations of the plural features, and sets the configuration information to be applied to the detection unit for each of the specified emitting directions.

7. A computer-implemented method, the method comprising:
obtaining position information indicative of a position of a body;
obtaining configuration information indicative of a parameter to be set to a detection unit, the configuration information being included in feature data for each of features registered in map data, the parameter being configured to be used by the detection unit to detect a feature substantially at the position indicated by the position information,
the parameter being determined depending on a reflectance of the feature,
the configuration information being associated with a cycle period of light emission; and
controlling the detection unit based on the configuration information to detect a target feature by applying the cycle period of light emission, which is associated with the configuration information corresponding to the target feature, to the detection unit.

8. The computer-implemented method of claim 7, wherein the body is a vehicle.

9. The computer-implemented method of claim 7, wherein the configuration information further comprises information on a parameter associated with the light emission by an emitter of the detection unit that is configured to emit light while changing an emitting direction of the light.

10. The computer-implemented method of claim 7, wherein the controlling the detection unit based on the configuration information comprises obtaining the configuration information corresponding to the feature from a database of feature information that includes the configuration information associated with the feature.

11. The computer-implemented method of claim 10, wherein the database is positioned at the body, or at a server.

12. The computer-implemented method of claim 7, further comprising emitting, by the detection unit, light, while changing an emitting direction of the light,
wherein for plural features to be detected by the detection unit, based on the position information associated with the plural features and the position information associated with the body, specifying emitting directions for respective locations of the plural features, and setting the configuration information to be applied to the detection unit for each of the specified emitting directions are performed.

13. A control device comprising:
a memory configured to store configuration information indicative of a parameter to be set to a detection unit for each reflectance of a feature; and
a control unit, including a microprocessor, configured to:
   obtain position information indicative of a position of a body;
   obtain feature data regarding features situated around the body, the feature data including position information and reflectance of each of the features, the configuration information being associated with a cycle period of light emission; and
   control the detection unit based on the configuration information and the feature data to detect a target feature by applying the cycle period of light emission, which is associated with the configuration information corresponding to the target feature, to the detection unit.

14. The control device according to claim 13, wherein the parameter is a parameter of the light emission by an emitter of the detection unit configured to emit light while changing an emitting direction of the light.

15. The control device according to claim 14, wherein the control unit controls the emitter to emit the light toward each of the features based on the reflectance of the each of the features according to the configuration information.

* * * * *